(12) United States Patent
Ma et al.

(10) Patent No.: US 10,927,811 B2
(45) Date of Patent: Feb. 23, 2021

(54) CONTROL METHOD, MASTER CONTROLLER, SYSTEM, AND CENTRAL CONTROLLER FOR WIND TURBINES

(71) Applicant: BEIJING GOLDWIND SCIENCE & CREATION WINDPOWER EQUIPMENT CO., LTD., Beijing (CN)

(72) Inventors: Lei Ma, Beijing (CN); Qingjiang Li, Beijing (CN); Yong Lu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/776,311

(22) PCT Filed: Jun. 8, 2017

(86) PCT No.: PCT/CN2017/087623
§ 371 (c)(1),
(2) Date: May 15, 2018

(87) PCT Pub. No.: WO2018/040658
PCT Pub. Date: Mar. 8, 2018

(65) Prior Publication Data
US 2018/0328338 A1    Nov. 15, 2018

(30) Foreign Application Priority Data

Aug. 31, 2016 (CN) .......................... 201610800069.1

(51) Int. Cl.
F03D 7/02        (2006.01)
F03D 7/04        (2006.01)
(Continued)

(52) U.S. Cl.
CPC ............. *F03D 7/026* (2013.01); *F03D 7/048* (2013.01); *G01P 5/02* (2013.01); *G05B 15/02* (2013.01);
(Continued)

(58) Field of Classification Search
CPC . F03D 7/026; F03D 7/048; G01P 5/02; F05B 2260/85; F05B 2270/20; F05B 2270/32; Y02E 10/723
(Continued)

(56) References Cited

U.S. PATENT DOCUMENTS 6,222,456 B1 *  4/2001  Tice ........................ G08B 29/26
                                                        340/630
7,025,567 B2 *  4/2006  Wobben ................. F03D 7/0224
                                                        415/118
(Continued)

FOREIGN PATENT DOCUMENTS

CN         101868766 A         10/2010
CN         102305177 A          1/2012
(Continued)

OTHER PUBLICATIONS

Sheng Su, Method for Controlling Recut-in of Wind-Driven Power Generators on Basis of Wind Speed and Time Combination Dead Zones (Translation), 2016, ESPACENT Patent Translation (Year: 2016).*
(Continued)

*Primary Examiner* — Robert E Fennema
*Assistant Examiner* — Christopher W Carter

(57) ABSTRACT

A start control method for wind turbines (102), comprising: a master control determines whether its real-time wind speed reaches a preset start wind speed when a wind speed of at least one wind turbine (102) or anemometer tower in a wind farm reaches or exceeds the preset start wind speed; the
(Continued)

master controller updates a corresponding number simulative start times when determining that its real-time wind speed reaches or exceeds the preset start wind speed, and starts the wind turbine (102) when the number of simulative start times reaches a preset count value. The present invention also relates to a master controller, a system, and a central controller for wind turbines (102).

10 Claims, 8 Drawing Sheets

(51) Int. Cl.
*G05B 15/02* (2006.01)
*G01P 5/02* (2006.01)

(52) U.S. Cl.
CPC ....... *F05B 2260/85* (2013.01); *F05B 2270/20* (2013.01); *F05B 2270/32* (2013.01); *Y02E 10/72* (2013.01)

(58) Field of Classification Search
USPC .......................................... 700/287
See application file for complete search history.

(56) References Cited

U.S. PATENT DOCUMENTS

| | | | |
|---|---|---|---|
| 2010/0314874 | A1 | 12/2010 | Bluhm et al. |
| 2011/0266798 | A1 | 11/2011 | Baba |
| 2014/0110941 | A1* | 4/2014 | Kjær et al. ............ F03D 7/0264 |
| | | | 290/44 |
| 2014/0117668 | A1* | 5/2014 | Jayant ...................... H02P 9/04 |
| | | | 290/44 |
| 2015/0233348 | A1 | 8/2015 | Hiremath et al. |

FOREIGN PATENT DOCUMENTS

| | | |
|---|---|---|
| CN | 102782317 A | 11/2012 |
| CN | 102937071 A | 2/2013 |
| CN | 104103163 A | 10/2014 |
| CN | 104463511 A | 3/2015 |
| CN | 104612897 A | 5/2015 |
| CN | 104712498 A | 6/2015 |
| CN | 104806448 A | 7/2015 |
| CN | 105863962 A | 8/2016 |
| EP | 1562281 A1 | 8/2005 |
| EP | 2487365 A1 | 8/2012 |
| EP | 2840257 A1 | 2/2015 |
| WO | 2013/183081 A1 | 12/2013 |

OTHER PUBLICATIONS

Jwusheng Hu, et al; "Start/Stop Control of Fixed-Pitch Wind Energy Turbines", Solar Energy, vol. 45; Issue 1, pp. 29-40, Dec. 1991.
Extended European Search Report dated Apr. 26, 2019; Appln. No. 17844965.8.
The International Search Report and Written Opinion dated Sep. 13, 2017; PCT/CN2017/087623.
The First Chinese Office Action dated Jul. 30, 2018; Appln. 201610800069.1 (With 1 page English Summary).

* cited by examiner

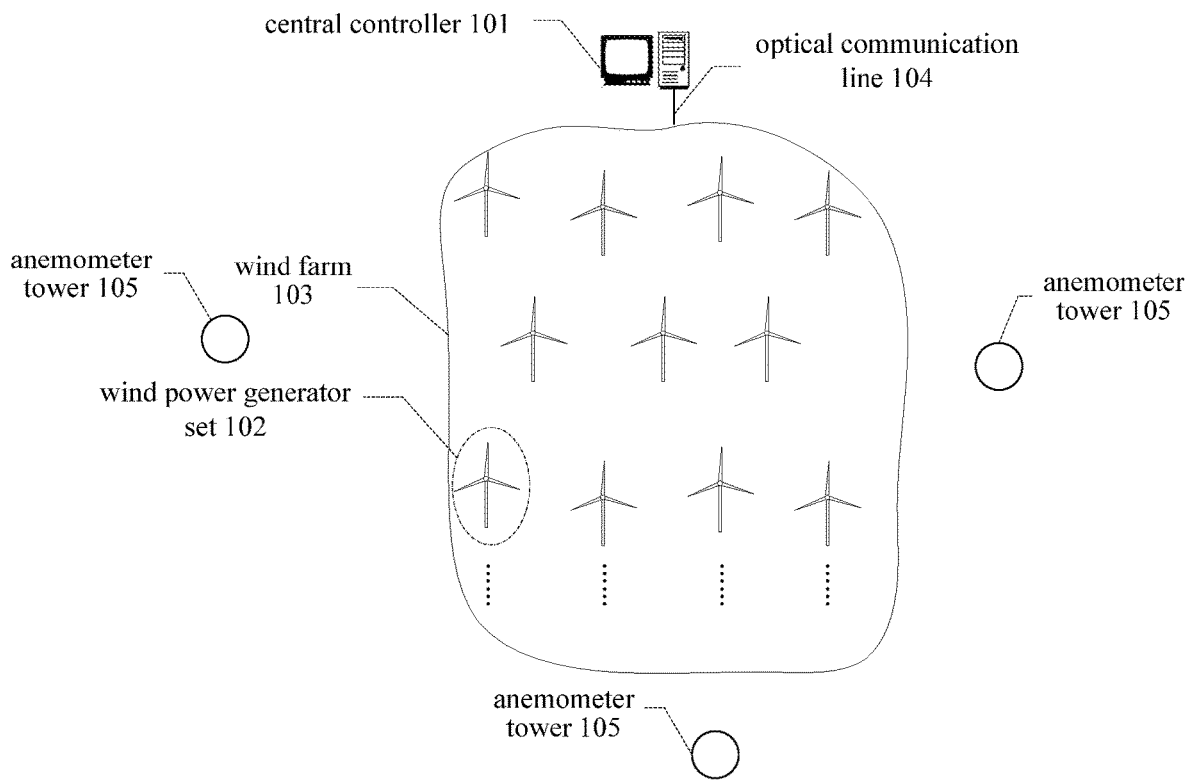

Figure 1B a main controller of a wind power generator set determining whether a real-time wind speed of the wind power generator set reaches a preset starting wind speed when a wind speed of at least one wind power generator set in a wind farm or an anemometer tower reaches or exceeds the preset starting wind speed — S201 the main controller updating the quantity of analog starts when determining that the real-time wind speed reaches or exceeds the preset starting wind speed, and starting the wind power generator set when the quantity of the analog starts reaches a preset count value — S202

Figure 2

CONTROL METHOD, MASTER CONTROLLER, SYSTEM, AND CENTRAL CONTROLLER FOR WIND TURBINES

CROSS REFERENCE TO RELATED APPLICATIONS

The present disclosure is a national phase of International Application No. PCT/CN2017/087623 which claims priority to Chinese Patent Application No. 201610800069.1, filed on Aug. 31, 2016 with the State Intellectual Property Office of People's Republic of China, the content of which are all incorporated herein by reference.

TECHNICAL FIELD

The present disclosure relates to the field of wind power, and particularly to a control method for starting a wind power generator set, a main controller, a control system and a central controller.

BACKGROUND

With gradual expansion of scale of wind power generator sets and increasing improvement in safety protection of wind power generator sets, power generation performance of wind power generator sets, i.e., power generation amount and availability, is getting more and more attention.

The wind power generator set includes a main controller, a wind power generator, and so on. The wind power generator may also be called as a wind turbine. The main controller may control the wind turbine to cause the wind turbine to convert wind power into electricity power, so as to achieve wind power generation. Currently, the main controller may make determination based on a wind speed detected by a wind speed sensor and start the wind turbine if the detected wind speed is always greater than a preset starting wind speed in a preset time period, so as to achieve starting of the wind turbine.

However, the main controller makes determination based on the detected wind speed and each time the wind turbine is started it is required that the wind speed is always greater than the preset starting wind speed in a preset time period. In this case, the start time of the wind turbine is long and the utilization rate of wind energy is low.

SUMMARY

The present disclosure provides a control method for starting a wind power generator set, a main controller, a control system and a central controller, for reducing start time of a wind turbine and improving utilization rate of wind energy.

A control method for starting a wind power generator set is provided according to the present disclosure, including: determining, by a main controller of the wind power generator set, whether a real-time wind speed of the wind power generator set reaches a preset starting wind speed, when a wind speed of at least one wind power generator set in a wind farm or an anemometer tower reaches or exceeds the preset starting wind speed; and updating, by the main controller, the quantity of analog starts when determining that the real-time wind speed reaches or exceeds the preset starting wind speed, and starting the wind power generator set when the quantity of the analog starts reaches a preset count value.

A main controller of a wind power generator set is further provided according to the present disclosure, including: a determination module, configured to determine whether a real-time wind speed of the wind power generator set reaches a preset starting wind speed, when a wind speed of at least one wind power generator set in a wind farm or an anemometer tower reaches or exceeds the preset starting wind speed; an updating module, configured to update the quantity of analog starts when determining that the real-time wind speed reaches or exceeds the preset starting wind speed; and a starting module, configured to start the wind power generator set corresponding to the main controller when the real-time wind speed reaches or exceeds the preset starting wind speed and the quantity of the analog starts reaches a preset count value.

A central controller of a wind farm is further provided according to the present disclosure, including: a generating module, configured to generate wind coming indication information when a wind speed of at least one wind power generator set in the wind farm or an anemometer tower changes and the wind speed is greater than a preset starting wind speed; and a sending module, configured to send the wind coming indication information.

A control system of a wind power generator set is further provided according to the present disclosure, including: a controller of the wind power generator set and a central controller of a wind farm connected to the controller, wherein the main controller is any of the main controllers mentioned above and the central controller is any of the central controllers mentioned above.

For the control method of the wind power generator set, the main controller, the system and the central controller provided according to the present disclosure, the main controller of the wind power generator set determines whether a real-time wind speed of the wind power generator set reaches a preset starting wind speed when the wind speed of at least one wind power generator set in a wind farm or an anemometer tower reaches or exceeds a preset starting wind speed, updates the quantity of analog starts when determining that real-time wind speed reaches or exceeds the preset starting wind speed, and starts the wind power generator set when the quantity of the analog starts reaches a preset count value. According to the method, if the wind speed of at least one wind power generator set in the wind farm or an anemometer tower reaches or exceeds the preset starting wind speed, whether the real-time wind speed reaches the preset starting wind speed is determined in advance, thereby enabling the main controller of the wind power generator set to update the quantity of the analog starts in advance, and in a case where the quantity of the analog starts of the first wind turbine reaches the preset count value, the first wind turbine can be started directly. Therefore, in the method, the start time of the wind turbine can be shortened and the utilization rate of wind energy and the power generation amount of the wind turbine can be increased.

BRIEF DESCRIPTION OF THE DRAWINGS

In order to illustrate technical solutions of the embodiment of the present disclosure or the conventional technology more clearly, drawings to be used in the description of the embodiments or the conventional technology are briefly described below. Apparently, the drawings described below only illustrate some embodiments of the present disclosure, and other drawings can be obtained by those skilled in the art without any creative work based on these drawings.

FIG. 1B is a schematic structural diagram of a control system of a wind power generator set according to another embodiment of the present disclosure;

FIG. 2 is a flow chart of a control method for starting a wind power generator set according to a first embodiment of the present disclosure;

DETAILED DESCRIPTION OF EMBODIMENTS

In order to make the objectives, technical solutions and advantages of embodiments of the present disclosure more clearly, technical solutions according to the embodiments of the present disclosure will be described clearly as follows in conjunction with the drawings of the embodiments of the present disclosure. Apparently, the described embodiments are only a few rather than all of embodiments of the present disclosure. Any other embodiments obtained by those skilled in the art based on the embodiments in the present disclosure without any creative work fall within the scope of protection of the disclosure.

A control method for starting a wind power generator set, a main controller, a central controller and a system provided according to the following embodiments of the present disclosure may be applied to a control system of a wind turbine, for controlling start of a wind turbine in a wind farm, so that the wind turbine generates electricity by using wind power.

Figure 1A:
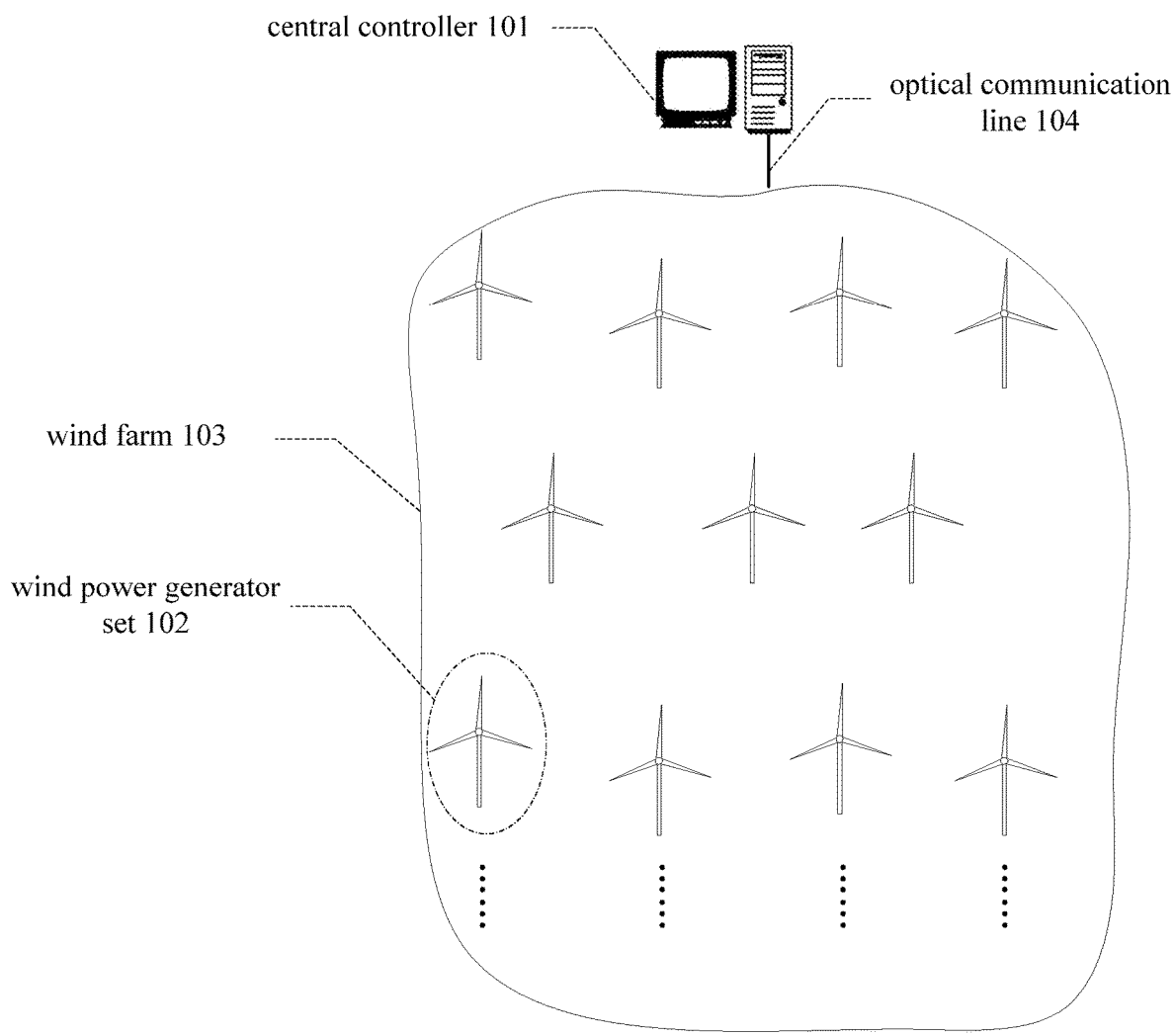
FIG. 1A is a schematic structural diagram of a control system of a wind power generator set according to an embodiment of the present disclosure.

FIG. 1A is a schematic structural diagram of a control system of a wind power generator set according to an embodiment of the present disclosure. As shown in FIG. 1A, the control system of the wind turbine may include a central controller 101 and at least one wind power generator set 102. The at least one wind power generator set 102 may include a wind power generator set in a wind farm 103, and may also include wind power generator sets in multiple wind farms. The wind power generator set in a wind farm 103 is taken as an example in FIG. 1A. Each wind power generator set 102 may include a main controller (not shown) and a wind turbine (not shown). The main controller of each wind power generator set 102 is connected to the wind turbine of each wind power generator set 102. The main controller of each wind power generator set 102 is also connected to the central controller 101. For example, the main controller of each wind power generator set 102 may be connected to the central controller 101 through an optical communication line 104, and the main controller of each wind power generator set 102 may be connected to the central controller 101 through the optical communication bus 104 in a form of ring network connection. The main controller may also be connected to the central controller 101 in other manners, which are not limited herein.

FIG. 1B is a schematic structural diagram of a control system of a wind turbine according to another embodiment of the present disclosure. FIG. 1B differs from FIG. 1A in that the control system of the wind turbine may also include at least one anemometer tower 105. Each anemometer tower 105 may be, for example, located around the wind farm where the wind power generator set 102 is located.

In FIGS. 1A and 1B, the central controller 101 may cause the main controller of each wind power generator set 102 to control start of the wind turbine of each wind power generator set by sending an instruction to the main controller of each wind power generator set 102. The central controller 101 may also be called as a central monitoring device. For example, the central controller 101 may make a determination instruction based on information reported by the main controller of each wind power generator set 102, such as wind speed data of the wind turbine of each wind power generator set 102, the quantity of analog starts of each wind power generator set 102, the wind speed data of the anemometer tower and so on.

For example, in FIG. 1A, the central controller 101 may determine the current wind speed of the wind farm based on the wind speed data of each wind power generator set 102 reported by the main controller of each wind power generator set 102, and then achieve start control of the wind turbine of each wind power generator set 102. In FIG. 1B, the main controller 101 may determine the current wind speed of the wind farm based on the wind speed data of each wind power generator set 102 reported by the wind turbine controller of each wind power generator set 102, or may determine the current wind speed of the wind farm based on the wind speed data of the anemometer tower 105 reported by the anemometer tower 105, and then achieve start control of each wind power generator set 102.

It should be noted that the above control system of the wind turbine is merely illustrative, which is not limited herein.

In order to describe the control method for starting the wind power generator set, the main controller and the central controller provided according to the present disclosure more clearly, the present disclosure is illustrated by a variety of examples in the following embodiments.

FIG. 2 is a flow chart of a control method for starting a wind power generator set provided according to a first embodiment of the present disclosure. The control method for starting the wind power generator set shown in FIG. 2 may be implemented by the main controller of the wind power generator set through software and/or hardware. As shown in FIG. 2, the control method for starting the wind power generator set, for example, may include S201 to S202.

In S202, a main controller of the wind power generator set determines whether a real-time wind speed of the wind power generator set reaches a preset starting wind speed when a wind speed of at least one wind power generator set in a wind farm or an anemometer tower reaches or exceeds the preset starting wind speed.

Specifically, the wind speed of at least one wind power generator set in the wind farm or an anemometer tower reaches or exceeds the preset starting wind speed indicates that the wind is coming but has not arrived at the wind power generator set corresponding to the main controller. The main controller may compare the real-time wind speed with the preset starting wind speed in advance when the wind is coming but has not arrived at the wind power generator set corresponding to the main controller.

In an implementation, the main controller of the wind power generator set may determine whether the real-time wind speed reaches the preset starting wind speed when the wind speed of at least one wind power generator set in the wind farm reaches or exceeds the preset starting wind speed. The wind power generator set may be any wind power generator set in the control system of the wind turbine as shown in FIG. 1. The wind power generator set and the at least one wind power generator set may be located in the same wind farm. The at least one wind power generator set may be located in the wind farm at a location closest to the wind coming direction. The wind power generator set corresponding to the main controller performing S201 may be any wind power generator set in the wind farm except for the wind power generator set located closest to the wind coming direction.

In the above implementation, the wind firstly arrives at the wind power generator set located closest to the wind coming direction, and the wind speed of the at least one wind power generator set in the wind farm reaches or exceeds the preset starting wind speed indicates that the wind is coming but the wind has not arrived at the wind power generator sets located in other positions of the wind farm, i.e., the wind power generator sets except for the wind power generator set at the location closest to the wind coming direction. Therefore, in the method, the main controller of the wind power generator set determines whether the real-time wind speed of the wind power generator set reaches the preset starting wind speed when the wind speed of the at least one wind power generator set in the wind farm reaches or exceeds the preset starting wind speed, thereby enabling the wind power generator sets in the wind farm except for the wind power generator set located closest to the wind coming direction to compare its real-time wind speed with the preset starting wind speed in advance.

In another implementation, the main controller of the wind power generator set may determine whether its real-time wind speed reaches the preset starting wind speed when the wind speed of the anemometer tower reaches or exceeds the preset starting wind speed.

A distance between the anemometer tower and the wind power generator set in the wind farm is in a preset range. The anemometer tower may be any anemometer tower located closest to the wind coming direction of the wind farm. The anemometer tower may be located in any wind coming direction of the wind farm. Therefore, the wind may arrive at the anemometer tower firstly. For example, the anemometer tower may be any anemometer tower 105 among the at least one anemometer tower shown in FIG. 1B. The anemometer tower may be provided with a wind speed sensor, for acquiring the wind speed data of the anemometer tower.

In the above another implementation, the wind firstly arrives at the anemometer tower located closest to the wind coming direction, and the wind speed of the anemometer tower reaches or exceeds the preset starting wind speed indicates that the wind is coming but the wind has not arrived at the wind power generator sets in the wind farm. Therefore, in the method, the main controller of the wind power generator set determines whether its real-time wind speed reaches the preset starting wind speed when the wind speed of the anemometer tower of the wind farm reaches or exceeds the preset starting wind speed, thereby enabling the wind power generator sets in the wind farm to compare its real-time wind speed with the preset starting wind speed in advance.

In S202, the main controller updates the quantity of analog starts when determining that the real-time wind speed reaches or exceeds the preset starting wind speed and starts the wind power generator set when the quantity of the analog starts reaches a preset count value.

The real-time wind speed may be the real-time wind speed of the wind power generator set corresponding to the main controller. The real-time wind speed of the wind power generator set corresponding to the main controller may be determined based on real-time wind speed data obtained by a wind speed sensor of the wind power generator set corresponding to the main controller. As long as the real-time wind speed reaches or exceeds the preset starting wind speed, the main controller updates the quantity of the analog starts corresponding to the main controller, for example, performs an increment operation on the quantity of the analog starts. In a case where the real-time wind speed is less than the preset starting wind speed, the main controller may keep the quantity of the analog starts unchanged.

For example, the preset starting wind speed is 3 m/s, and the main controller may determine that the real-time wind speed exceeds the preset starting wind speed and thus update the quantity of the analog starts corresponding to the main controller as long as the real-time wind speed reaches or exceeds the preset starting wind speed, for example, the real-time wind speed is 4 m/s. The quantity of the analog starts corresponding to the main controller may be 30, and the main controller may determine that the quantity of the analog starts reaches the preset count value if the preset count value is 30.

The quantity of the analog starts of the first wind turbine starts to be updated when the reference wind speed reaches the preset starting wind speed and the wind speed of the first wind turbine has not reached the preset starting wind speed. In this case, the quantity of the analog starts of the first wind turbine has been updated, that is, the first wind turbine has started timing, when the wind speed of the first wind turbine reaches the preset starting wind speed, but not the case that the timing is started until the wind speed of the first wind turbine reaches the preset starting wind speed. Therefore, in the method, the main controller of the first wind turbine starts the first wind turbine when the current wind speed of the first wind turbine reaches the preset starting wind speed and the quantity of the analog starts of the first wind turbine reaches the preset count value, thereby reducing the start time of the first wind turbine.

In the control method for starting the wind power generator set provided according to the first embodiment of the present disclosure, the main controller of the wind power generator set determines whether a real-time wind speed of the wind power generator set reaches a preset starting wind speed when the wind speed of at least one wind power generator set in the wind farm or an anemometer tower reaches or exceeds the preset starting wind speed, updates the quantity of analog starts when determining that the real-time wind speed reaches or exceeds the preset starting wind speed and starts the wind power generator set when the quantity of the analog starts reaches a preset count value. According to the method, whether the real-time wind speed reaches the preset starting wind speed is determined in advance when the wind speed of the at least one wind power generator set in the wind farm or the anemometer tower reaches or exceeds the preset starting wind speed, thereby enabling the main controller of the wind power generator set to update the quantity of the analog starts in advance. The first wind turbine can be started directly when the quantity of the analog starts of the first wind turbine also reaches the preset count value. Therefore, in the method, the start time of the wind turbine can be shortened, and the utilization rate of wind energy and the power generation amount of the wind turbine can be improved.

Figure 3:
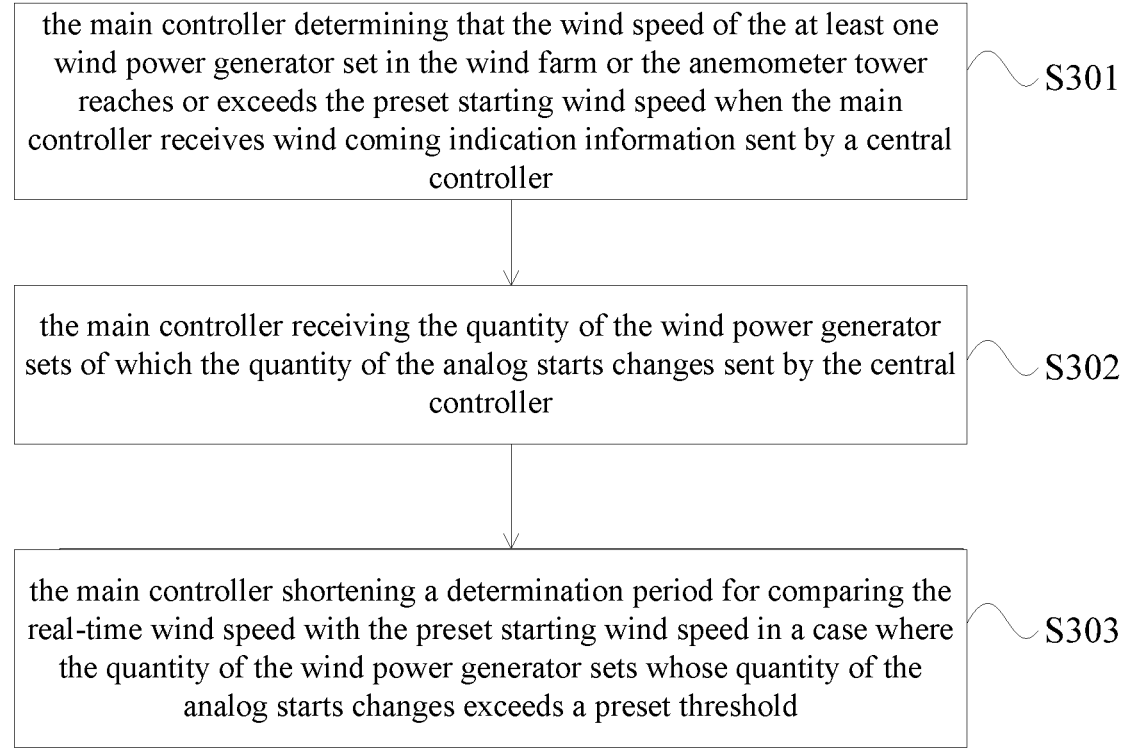
FIG. 3 is a flow chart of a control method for starting a wind power generator set according to a second embodiment of the present disclosure.

Optionally, a control method for starting a wind power generator set is further provided according to a second embodiment of the present disclosure. FIG. 3 is a flow chart of a control method for starting a wind generator set provided according to the second embodiment of the present disclosure. As shown in FIG. 3, before the main controller of the wind power generator set determining whether the real-time wind speed reaches the preset starting wind speed when the wind speed of at least one wind power generator set in the wind farm or the anemometer tower reaches or exceeds the preset starting wind speed in S201 in the above embodiment, the method may further include S301.

In S301, the main controller determines that the wind speed of the at least one wind power generator set in the wind farm or the anemometer tower reaches or exceeds the preset starting wind speed when the main controller receives wind coming indication information sent by a central controller.

For example, the central controller may be the central controller 101 of the wind turbine control system shown in FIG. 1. The main controller in S301 may determine, based on the wind coming indication information, that the wind speed of the at least one wind power generator set in the wind farm reaches or exceeds the preset starting wind speed when receiving the wind coming indication information sent by the central controller, or may determine, based on the wind coming indication information, that the wind speed of the anemometer tower reaches or exceeds the preset starting wind speed when receiving the wind coming indication information sent by the central controller.

After receiving the wind coming indication information, the main controller may determine the wind coming indication based on a wind coming flag in the wind coming indication information, and then determine that the wind speed of at least one wind power generator set in the wind farm or the anemometer tower reaches or exceeds the preset starting wind speed based on the wind coming indication. For example, if the wind coming flag in wind coming indication information is 1, the main controller may determine the wind coming indication and then determine that the wind speed of the at least one wind power generator set in the wind farm or the anemometer tower reaches or exceeds the preset starting wind speed.

In the method, the main controller may determine that the wind speed of the at least one wind power generator set or the anemometer tower reaches or exceeds the preset starting wind speed based on the wind coming indication information sent by the central controller. In this case, the main controller does not need to compare the wind speed of the at least one wind power generator set or the anemometer tower with the preset starting wind speed to determine that the wind speed of the at least one wind power generator set or the anemometer tower reaches or exceeds the preset starting wind speed, thereby reducing the processing burden of the main controller and improving the processing efficiency of the main controller.

Optionally, based on the above method, the method may further include:

the main controller setting the quantity of the analog starts to zero before determining whether the real-time wind speed reaches the preset starting wind speed.

Specifically, in the method, the main controller may firstly set the quantity of the analog starts to zero when determining that the wind speed of the at least one wind power generator set in the wind farm or the anemometer tower reaches or exceeds the preset starting wind speed, and then determine whether the real-time wind speed reaches the preset starting wind speed.

Optionally, based on the above method, the method may further include:

the main controller setting the quantity of the analog starts to zero after starting the wind power generator set.

Optionally, based on the above method, the method may further include:

the main controller setting the quantity of the analog starts to zero in a case where the quantity of the analog starts does not reach the preset count value within a preset time period from determining that the wind speed of the at least one wind power generator set or the anemometer tower reaches or exceeds the preset starting wind speed.

The wind is varying. The wind speed of the wind power generator set reaches the preset starting wind speed at a first moment indicates that the wind arrived at the wind power generator set corresponding to the main controller at the first moment. However, the quantity of the analog starts of the wind power generator set corresponding to the main controller has not reached the preset count value. Therefore, although the wind speed of the wind power generator set reaches the preset starting wind speed at the first moment, the main controller may further determine whether the wind speed of the wind power generator set reaches the preset starting wind speed at a second moment by comparing the wind speed of the wind power generator set at the second moment with the preset starting wind speed, in order to avoid the case that the wind speed of the wind power generator set at the second moment is reduced. If the wind speed of the wind power generator set at the first moment reaches the preset starting wind speed and the wind speed of the wind power generator set at the second moment also reaches the preset starting wind speed, the quantity of the analog starts of the first wind turbine continues to be updated, therefore, the wind speed of the wind power generator set reaches the preset starting wind speed constantly and steadily in a case where the quantity of the analog starts reaches the preset count value. As a result, in the method, frequent start and shutting down of the motor caused by low wind speed can be avoided while shortening the start time, and extra power consumption caused by frequent start and shutting down of the motor can be avoided.

In a case where the wind speed of the wind power generator set at the second moment does not reach the preset starting wind speed, i.e., the wind speed of the wind power generator set at the second moment is less than the preset starting wind speed, the main controller may keep the quantity of the analog starts of the first wind turbine unchanged and not set the quantity of the analog starts to zero, which can avoid re-timing caused by accidental reduction of the wind speed, therefore, long start time of the wind turbine caused by accidental reduction of the wind speed can be avoided and thus the utilization rate of wind energy and the power generation amount can be ensured.

The main controller may set the quantity of the analog starts to zero if the updated quantity of the analog starts does not reach the preset count value at the end moment of a preset time period from the main controller determining that the wind speed of the at least one wind power generator set or the anemometer tower reaches or exceeds the preset starting wind speed.

Specifically, the preset time period may be, for example, a preset scan period, such as 5 minutes.

The updated quantity of the analog starts does not reach the preset count value at the end moment of the preset time period indicates that, the number of times that the reference wind speed reaches the preset starting wind speed is less than the preset count value or the number of times that the wind speed of the wind power generator set reaches or exceeds the preset starting wind speed is less than the preset count value in the preset time period. That is, in the preset time period, the wind is not coming actually or the wind speed is instable. Thus, the main controller may set the quantity of the analog starts to zero, which can avoid unnecessary resource consumption caused by continuously comparing the wind speed of the wind power generator set with the preset starting wind speed value by the main controller.

Optionally, based on the above method, after the main controller receiving the wind coming indication information sent by the central controller in S301, the method may further include S302 to S303.

In S302, the main controller receives the quantity of wind power generator sets of which the quantity of the analog starts changes, sent by the central controller.

In S303, if the quantity of the wind power generator sets of which the quantity of the analog starts changes exceeds a preset threshold, the main controller shortens a determination period for comparing the real-time wind speed with the preset starting wind speed.

For example, the preset threshold may be the quantity of the wind power generator sets of which the quantity of the analog starts changes at a moment before the current moment. The quantity of the wind power generator sets of which the quantity of the analog starts changes exceeds the preset threshold may be, for example, the quantity of the wind power generator sets of which the quantity of the analog starts changes is increased.

For example, in a case where the quantity of the wind power generator sets of which the quantity of the analog starts changes at the current moment is 4 and the quantity of the wind power generator sets of which the quantity of the analog starts changes at a moment before the current moment is 3, the main controller may determine that the quantity of the wind power generator sets of which the quantity of the analog starts changes exceeds the preset threshold.

In a case where the determination period for comparing the real-time wind speed of the main controller with the preset starting wind speed is 0.5 s for each time, the main controller may shorten the determination period for comparing the real-time wind speed with the preset starting wind speed to be 0.25 s for each time when the main controller determines that the quantity of the wind power generator sets of which the quantity of the analog starts changes exceeds the preset threshold. In the preset time period such as 2 s, the original quantity of the analog starts is 4 at most, and the quantity of the analog starts is 8 at most after the determination period is shortened.

In the method, the main controller may accuracy determine that the wind is currently coming in a case where the quantity of the wind power generator sets of which the quantity of the analog starts changes exceeds the preset threshold, and thus may shorten the determination period for comparing the real-time wind speed with the preset starting wind speed, thereby speeding up update of the quantity of the analog starts and enabling the quantity of the analog starts to reach the preset count value more quickly. As a result, the start time of the wind power generator set is shortened effectively, and the utilization rate of wind energy and the power generation amount of the wind power generator set are increased.

In the method, the main controller may determine that the quantity of the wind power generator sets of which the quantity of the analog starts changes exceeds the preset threshold based on the quantity of the wind power generator sets of which the quantity of the analog starts changes sent by the central controller, and thus accuracy determine whether the wind is currently coming. It is not required to calculate distances between the wind power generator sets or distances between the wind power generator sets and the anemometer towers, directions and wind arrival moments of the wind power generator sets, and the like. Therefore, a large amount of complicated calculation can be avoided, data computation can be reduced, and the development cycle and difficulty of the main control software of the central controller and the main controller can be reduced, that is, software cost of the control system of the wind power generator set is reduced.

Since it is not required to detect the distances between the wind power generator sets or the distances between the wind power generator sets and the anemometer towers, the directions of the wind power generator sets and the like, it is not required to configure a positioning device such as a Global Positioning System (short for GPS) positioning indicator, thereby reducing the hardware cost of the wind turbine control system.

Optionally, the method may further include:

the main controller sending a period shortening indication to the central controller when the quantity of the wind power generator sets of which the quantity of the analog starts changes exceeds the preset threshold.

The central controller sends a period shortening instruction to the main controllers of other wind power generator sets, where the other wind power generator sets are wind turbines in the wind farm except for the wind power generator set corresponding to the main controller.

The main controllers of the other wind power generator sets each shortens the determination period for comparing its real-time wind speed with the preset starting wind speed based on the period shortening indication.

In the method, the main controller may send a period shortening indication to the main controllers of the other wind power generator sets via the central controller if the main controller determines that the quantity of the wind power generator sets of which the quantity of the analog starts changes exceeds the preset threshold, thereby shortening the determination period for comparing the wind speeds of the other wind turbines with the preset starting wind speed and speeding up updates of the quantities of the analog starts of the other wind power turbines, enabling the quantities of the analog starts of the other wind turbines to reach the preset count value more quickly. As a result, the start time of the wind power generator set is shortened effectively, and the utilization rate of wind energy and the power generation amount of the wind power generator set are increased.

Optionally, based on the above method, the method may further include:

the main controller updating the quantity of the analog starts when the wind speed of the wind power generator set reaches the preset starting wind speed, during a downtime of the wind power generator set; and the main controller starting the wind power generator set when the quantity of the analog starts of the wind power generator set reaches the preset count value, after fault reset of the wind power generator set.

Specifically, during the downtime of the wind power generator set, the main controller continue to detect the wind speed of the wind power generator set and updates the quantity of the analog starts corresponding to the wind power generator set when the wind speed of the wind power generator set reaches the preset starting wind speed. That is, the main controller can start timing in advance before fault reset of the wind power generator set, rather than start timing after the fault reset of the wind power generator set.

After fault reset of the wind power generator set, the wind power generator set is started directly when the quantity of the analog starts of the wind power generator set reaches the preset count value and the wind speed of the wind power generator set reaches the preset starting wind speed.

It should be noted that the main controller may reset the quantity of the analog starts corresponding to the wind power generator set every preset time period, such as set the quantity of the analog starts to zero, after the fault of the wind power generator set. If the fault of the wind power generator set is not reset until the end moment of a preset time period from the fault of the wind power generator set, the main controller may reset the quantity of the analog starts corresponding to the wind power generator set, such as set the quantity of the analog starts to zero, and re-compare the wind speed of the wind power generator set with the preset starting wind speed and re-update the quantity of the analog starts of the wind power generator set when the wind speed of the wind power generator set reaches the preset starting wind speed.

In the method, during the downtime of the wind power generator set, the main controller of the wind power generator set continues to detect the wind speed of the wind power generator set and updates the quantity of the analog starts corresponding to the wind power generator set when the wind speed of the wind power generator set reaches the preset starting wind speed. The main controller starts timing in advance before fault reset of the wind power generator set, rather than start timing after fault reset of the wind power generator set. Therefore, after fault reset of the wind power generator set, the quantity of the analog starts of the wind power generator set already has been updated and if the quantity of the analog starts of the wind power generator set also reaches the preset count value, the wind power generator set can be started directly. Therefore, in the method, the start time after downtime of the wind power generator set can be shortened, and the utilization rate of wind energy and the power generation amount of the wind power generator set can be increased.

Figure 4:
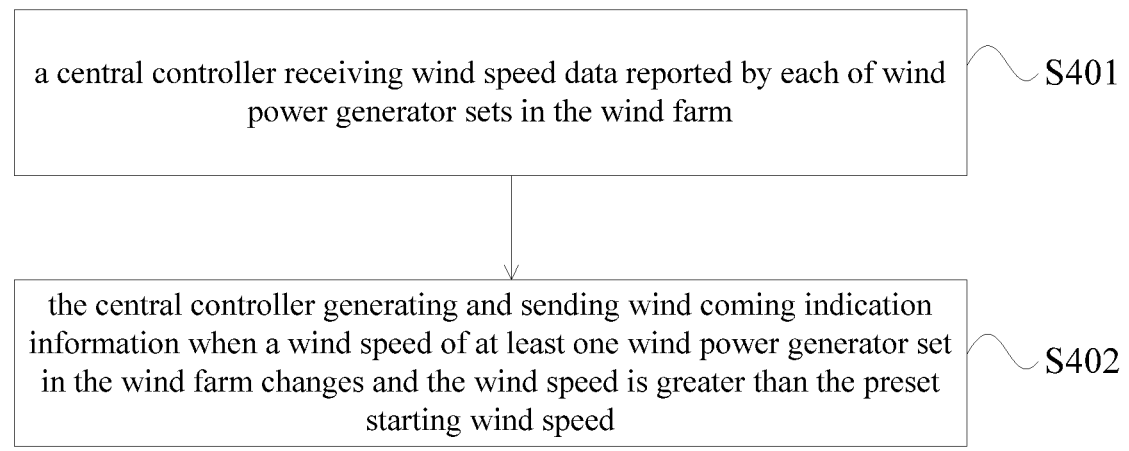
FIG. 4 is a flow chart of another control method for starting a wind power generator set according to the second embodiment of the present disclosure.

Optionally, a control method for starting a wind power generator set is further provided according to the second embodiment of the present disclosure. FIG. 4 is a flow chart of another control method for starting a wind power generator set provided according to the second embodiment of the present disclosure. As shown in FIG. 4, before the main controller receiving the wind coming indication information sent by the central controller in S301, the method may further include S401 to S402.

In S401, the central controller receives wind speed data reported by each of wind power generator sets in the wind farm.

Specifically, the wind speed information of each of the wind power generator sets may be wind speed data of each of the wind power generator sets detected by a wind speed sensor of each of the wind power generator sets and acquired by the main controller of each of the wind power generator sets from the wind speed sensor of each of the wind power generator sets. For example, the wind speed sensor of each of the wind power generator sets may detect the wind speed data of each of the wind power generator set every preset time period such as 1 s.

In S402, the central controller generates and sends wind coming indication information when the wind speed of at least one wind power generator set in the wind farm changes and the wind speed is greater than the preset starting wind speed.

Specifically, for example, the wind coming indication information may include a wind coming flag, and wind coming indication may be represented by a value of the wind coming flag in the wind coming indication information.

For example, the central controller may compare the wind speed of each of the wind power generator sets with the preset starting wind speed, set the wind coming flag in the wind coming indication information to be 1 for representing wind coming indication if the wind speed of at least one wind power generator set changes and the wind speed is greater than the preset starting wind speed, and set the wind coming flag in the wind coming indication information to be 0 for representing no wind indication if the wind speed of at least one wind power generator set changes and the wind speed is greater than the preset starting wind speed.

It should be noted that the wind coming flag for indicating wind coming indication in the wind coming indication information may be represented by other parameters. The above is only illustrative, which is not described in detail herein.

Optionally, the central controller generating and sending the wind coming indication information when the wind speed of at least one wind power generator set in the wind farm changes and the wind speed is greater than the preset starting wind speed as described in the above S402 includes:

the central controller determining, among the wind power generator sets, a wind power generator set with greatest wind speed variation as a reference wind turbine, based on the wind speed data of each of the wind power generator sets; and the central controller generating and sending the wind coming indication information when the wind speed of the reference wind turbine changes and the wind speed is greater than the preset starting wind speed.

Specifically, the central controller may determine the wind speed variation of the wind speed data of each of the wind power generator sets based on the wind speed data of each of the wind power generator set and the wind speed data of each of the wind power generator sets at a moment before the current moment, and then determine the wind turbine with the greatest wind speed variation as the reference wind turbine based on the wind speed variation of the multiple wind power generator sets. The wind speed variation of the reference wind turbine is greatest, that is, the wind firstly arrives at the location where the reference wind turbine is located. For example, the reference wind turbine may be a wind turbine around the wind farm, such as a wind turbine located closest to the wind coming direction among the multiple wind power generator sets.

The central controller sends the wind coming indication information to the main controllers of other wind turbines of the multiple wind power generator sets except for the reference wind turbine. The first wind turbine is any wind turbine of the multiple wind turbines except for the reference wind turbine. In the method, the central controller may send the wind coming indication information to the controller of any other wind turbine except for the reference wind turbine.

In the method, when the wind speed of the reference wind turbine changes and the wind speed is greater than the preset starting wind speed, that is, the wind has arrived at the reference wind turbine, the central controller sends the wind coming indication information, so that the main controller can compare its wind speed with the preset starting wind speed and update the quantity of the analog starts in advance in a case where the wind has not arrived at the wind power generator set. Therefore, the updating opportunity of the quantity of the analog starts is predated, thereby reducing the start time of the wind power generator set and increasing the utilization rate of wind energy and the power generation amount of the wind power generator set.

Figure 5:
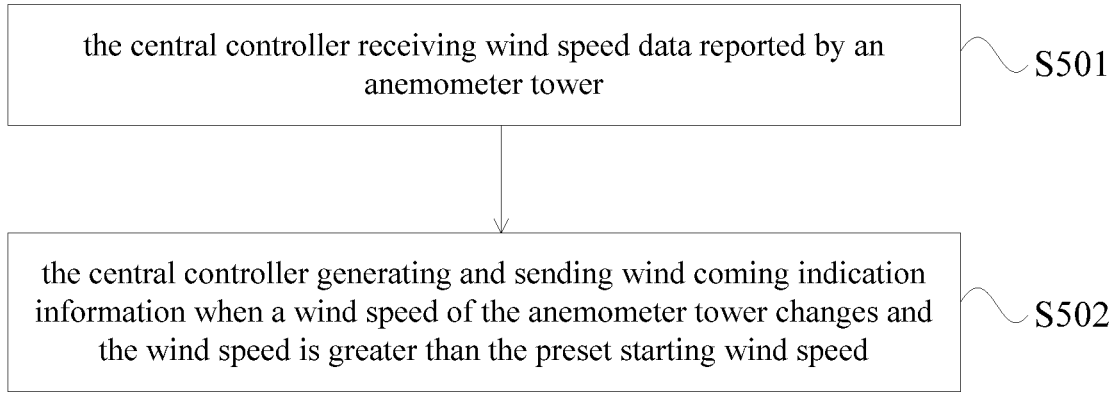
FIG. 5 is a flow chart of another control method for starting a wind power generator set according to the second embodiment of the present disclosure.

Alternatively, a control method for starting a wind power generator set is further provided according to the second embodiment of the present disclosure. FIG. 5 is a flow chart of another control method for starting a wind power generator set provided according to the second embodiment of the present disclosure. As shown in FIG. 5, before the main controller receiving the wind coming indication information sent by the central controller in S301, the method may further include S501 to S502.

In S501, the central controller receives the wind speed data reported by the anemometer tower.

In S502, the central controller generates and sends the wind coming indication information when the wind speed of the anemometer tower changes and the wind speed is greater than the preset starting wind speed.

The central controller may determine that the wind speed of the anemometer tower changes based on the wind speed data of the anemometer tower and the wind speed data of the anemometer tower at a moment before the current moment, and determine whether the wind speed of the anemometer tower reaches the preset starting wind speed by comparing the wind speed of the anemometer tower with the preset starting wind speed. In the method, the central controller may send the wind coming indication information to the controller of any wind turbine in the wind farm.

In the method, the central controller sends the wind coming indication information to the main controller when the wind speed of the anemometer tower changes and the wind speed is greater than the preset starting wind speed, so that the main controller can update the quantity of the analog starts of the wind power generator set in a case where the wind has not arrived at the wind controller. Therefore, the update opportunity of the quantity of the analog starts of the wind power generator set is predated, thereby shortening the start time of the wind power generator set and increasing the utilization rate of wind energy and the power generation amount of the wind power generator set.

Figure 6:
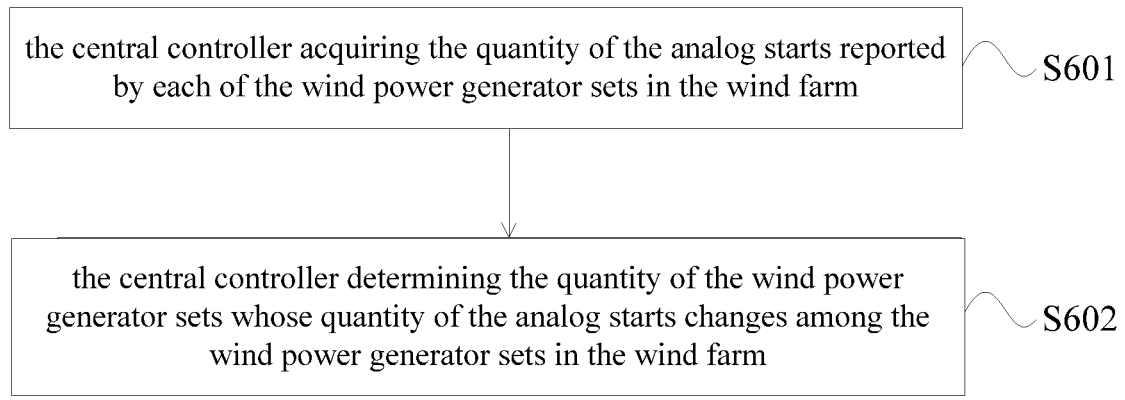
FIG. 6 is a flow chart of another control method for starting a wind power generator set according to the second embodiment of the present disclosure.

Based on any of the above methods, a control method for starting a wind power generator set is further provided according to the second embodiment of the present disclosure. FIG. 6 is a flow chart of another control method for starting a wind power generator set provided according to the embodiment of the present disclosure. As shown in FIG. 6, before the main controller receiving the quantity of the wind power generator sets of which the quantity of the analog starts changes sent by the central controller in the above S302, the method may further include S601 to S602.

In S601, the central controller acquires the quantity of the analog starts reported by each of the wind power generator sets in the wind farm.

For example, the central controller may receive the quantity of the analog starts of each of the wind power generator sets sent by the main controller of each of the wind power generator sets.

For example, the central controller may receive the quantity of the analog starts of the wind power generator set 1 sent by the main controller of the wind power generator set 1, which is 11, the quantity of the analog starts of the wind power generator set 2 sent by the main controller of the wind power generator set 2, which is 9, the quantity of the analog starts of the wind power generator set 3 sent by the main controller of the wind power generator set 3, which is 6, and the quantity of the analog starts of the wind power generator set 4 sent by the main controller of the wind power generator set 4, which is 2.

In S602, the central controller determines the quantity of the wind power generator sets of which the quantity of the analog starts changes among the wind power generator sets in the wind farm.

For example, in a case where the quantity of the analog starts of the wind power generator set 1 at the moment before the current moment is 10, the quantity of the analog starts of the wind power generator set 2 at the moment before the current moment is 8, the quantity of the analog starts of the wind power generator set 3 at the moment before the current moment is 4, and the quantity of the analog starts of the wind power generator set 4 at the moment before the current moment is 0, the central controller may determine that the quantity of the wind power generator sets of which the quantity of the analog starts changes is 4.

Figure 7:
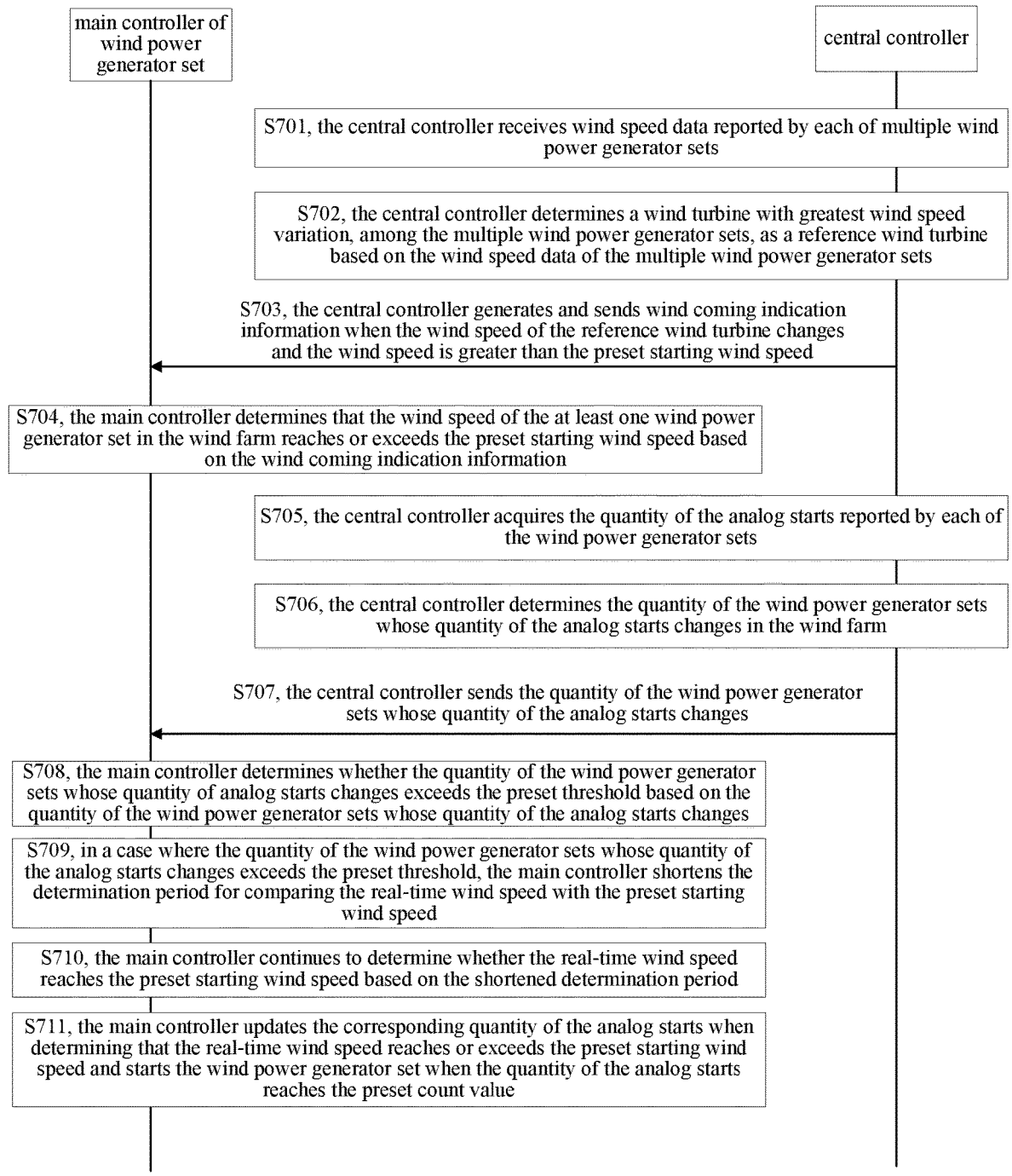
FIG. 7 is a flow chart of a control method for starting a wind power generator set according to a third embodiment of the present disclosure.

A control method for starting a wind power generator set is provided according to a third embodiment of the present disclosure. The method gives an exemplary illustration to the control methods for starting the wind power generator set provided according to the above embodiments by ways of examples. FIG. 7 is a flow chart of a control method for starting a wind power generator set according to the third embodiment of the present disclosure. As shown in FIG. 7, the method may include S701 to S711.

In S701, the central controller receives wind speed data reported by each of multiple wind power generator sets.

For example, the central controller may receive the wind speed data of each of the wind power generator sets sent by the main controller of each of the wind power generator sets.

In S702, the central controller determines, among the multiple wind power generator sets, a wind turbine with the greatest wind speed variation as the reference wind turbine based on the wind speed data of the multiple wind power generator sets.

In S703, the central controller generates and sends wind coming indication information when of the reference wind turbine changes and the wind speed is greater than the preset starting wind speed.

The central controller may send the wind coming indication information to any wind power generator set in the wind farm except for the reference wind turbine.

In S704, the main controller determines that the wind speed of at least one wind power generator set in the wind farm reaches or exceeds the preset starting wind speed based on the wind coming indication information.

In S705, the central controller acquires the quantity of the analog starts reported by each of the wind power generator sets.

For example, the central controller may receive the quantity of the analog starts of each of the wind power generator sets sent by the main controller of each of the wind power generator sets.

In S706, the central controller determines the quantity of the wind power generator sets of which the quantity of the analog starts changes in the wind farm.

In S707, the central controller sends the quantity of the wind power generator sets of which the quantity of the analog starts changes.

In S708, the main controller determines whether the quantity of the wind power generator sets of which the quantity of the analog starts changes exceeds the preset threshold based on the quantity of the wind power generator sets of which the quantity of the analog starts changes.

In S709, in a case where the quantity of the wind power generator sets of which the quantity of the analog starts changes exceeds the preset threshold, the main controller shortens the determination period for comparing the real-time wind speed with the preset starting wind speed.

In S710, the main controller continues to determine whether the real-time wind speed reaches the preset starting wind speed based on the shortened determination period.

In S711, the main controller updates the quantity of the analog starts when determining that the real-time wind speed reaches or exceeds the preset starting wind speed and starts the wind power generator set when the quantity of the analog starts reaches the preset count value.

In the control method for starting the wind power generator set provided according to the third embodiment of the present disclosure, the main controller of the wind power generator set determines whether the real-time wind speed reaches the preset starting wind speed when the wind speed of at least one wind power generator set in the wind farm or the anemometer tower reaches or exceeds the preset starting wind speed. The main controller of the wind power generator set updates the quantity of the analog starts when the real-time wind speed reaches or exceeds the preset starting wind speed and starts the wind power generator set when the quantity of the analog starts reaches the preset count value. In the method, the main controller of the wind power generator set determines in advance whether its real-time wind speed reaches the preset starting wind speed when the wind speed of at least one wind power generator set in the wind farm or the anemometer tower reaches or exceeds the preset starting wind speed, thereby enabling the main controller of the wind power generator set to update the quantity of the analog starts in advance and directly start the first wind turbine when the quantity of the analog starts of the first wind turbine also reaches the preset count value. Therefore, in the method, the start time of the wind turbine can be shortened, and the utilization rate of wind energy and the power generation amount of the wind power generator set can be increased.

Figure 8:
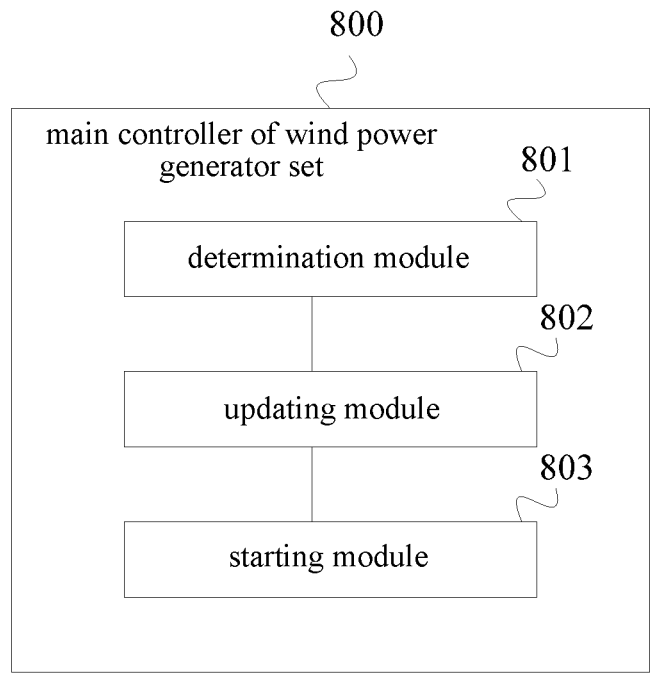
FIG. 8 is a schematic structural diagram of a main controller of a wind power generator set according to a fourth embodiment of the present disclosure.

A main controller of a wind power generator set is provided according to a fourth embodiment of the present disclosure, where the main controller may be any main controller of the wind power generator set shown in FIGS. 1A and 1B. FIG. 8 is a schematic structural diagram of a main controller of a wind power generator set provided according to the fourth embodiment of the present disclosure. As shown in FIG. 8, the main controller 800 of the wind power generator set may include a determination module 801, an updating module 802 and a starting module 803.

The determination module 801 is configured to determine whether a real-time wind speed of the wind power generator set reaches a preset starting wind speed when a wind speed of at least one wind power generator set in a wind farm or an anemometer tower reaches or exceeds the preset starting wind speed.

The updating module 802 is configured to update the quantity of analog starts when determining that the real-time wind speed reaches or exceeds the preset starting wind speed.

The starting module 803 is configured to start the wind power generator set corresponding to the main controller when the real-time wind speed reaches or exceeds the preset starting wind speed and the quantity of the analog starts reaches a preset count value.

Optionally, the main controller 800 of the wind power generator set may further include:

a receiving module configured to receive wind coming indication information sent by a central controller; and a wind determination module configured to determine that the wind speed of the at least one wind power generator set in the wind farm reaches or exceeds the preset starting wind speed when the receiving module receives the wind coming indication information sent by the central controller.

Optionally, the updating module 802 is further configured to set the quantity of the analog starts to zero before the determination module 801 determining whether the real-time wind speed reaches the preset starting wind speed; or set the quantity of the analog starts to zero after the starting module 803 starting the wind power generator set; or set the quantity of the analog starts to zero in a case where the quantity of the analog starts does not reach the preset count value within a preset time period from determining that the wind speed of the at least one wind power generator set or the anemometer tower reaches or exceeds the preset starting wind speed.

Optionally, the receiving module is further configured to receive the quantity of the wind power generator sets of which the quantity of the analog starts changes sent by the central controller.

The determination module 801 is further configured to shorten a determination period for comparing the real-time wind speed with the preset starting wind speed in a case where the quantity of the wind power generator sets exceeds a preset threshold.

Optionally, the updating module 802 is further configured to update the quantity of the analog starts when the wind speed of the wind power generator set reaches the preset starting wind speed, during a downtime of the wind power generator set.

The starting module 803 is further configured to start the wind power generator set corresponding to the main controller when the quantity of the analog starts of the wind power generator set reaches the preset count value, after fault reset of the wind power generator set.

The main controller of the wind power generator set provided according to the fourth embodiment of the present disclosure may perform the control method for starting the wind power generator set performed by any main controller shown in FIGS. 2 to 7. The specific implementation process and the beneficial effect are similar to the above embodiments, which are not described in detail herein.

Figure 9:
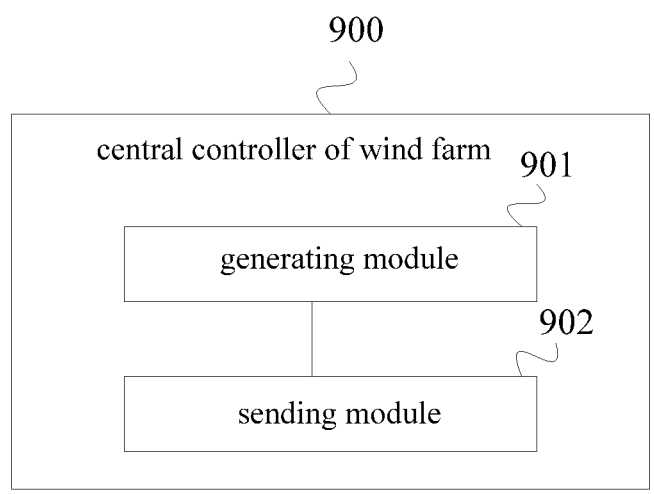
FIG. 9 is a schematic structural diagram of a central controller of a wind farm according to a fifth embodiment of the present disclosure.

A central controller of a wind farm is provided according to a fifth embodiment of the present disclosure. The central controller may be the central controller shown in FIGS. 1A and 1B. FIG. 9 is a schematic structural diagram of a central controller of a wind farm provided according to the fifth embodiment of the present disclosure. As shown in FIG. 9, a central controller 900 of a wind farm may include a generating module 901 and a sending module 902.

The generating module 901 is configured to generate wind coming indication information when a wind speed of at least one wind power generator set in the wind farm or an anemometer tower changes and the wind speed is greater than a preset starting wind speed.

The sending module 902 is configured to send the wind coming indication information.

Optionally, the central controller 900 of the wind farm may further include:

a first receiving module configured to receive wind speed data of each of wind power generator sets in the wind farm; and a reference wind turbine determination module configured to determine, based on the wind speed data of each of the wind power generator sets, a wind power generator set with greatest wind speed variation, among the wind power generator sets, as a reference wind turbine.

The generating module 901 is further configured to generate the wind coming indication information when a wind speed of the reference wind turbine changes and the wind speed is greater than the preset starting wind speed.

Alternatively, the central controller 900 of the wind farm may further include:

a second receiving module configured to receive wind speed data reported by the anemometer tower.

The generating module 901 is further configured to generate the wind coming indication information when a wind speed of the anemometer tower changes and the wind speed is greater than the preset starting wind speed.

Optionally, the central controller 900 of the wind farm may further include:

a third receiving module configured to receive a quantity of analog starts reported by each of the wind power generator sets in the wind farm; and a quantity determination module configured to determine a quantity of wind power generator sets of which the quantity of the analog starts changes among the wind power generator sets in the wind farm.

The sending module 902 is further configured to send the quantity of the wind power generator sets of which the quantity of the analog starts changes.

The central controller of the wind farm provided according to the fifth embodiment of the present disclosure may perform the control method for starting the wind power generator set performed by any central controller shown in FIGS. 2 to 7. The specific implementation process and the beneficial effect are similar to the above embodiments, which are not described in detail herein.

Figure 10:
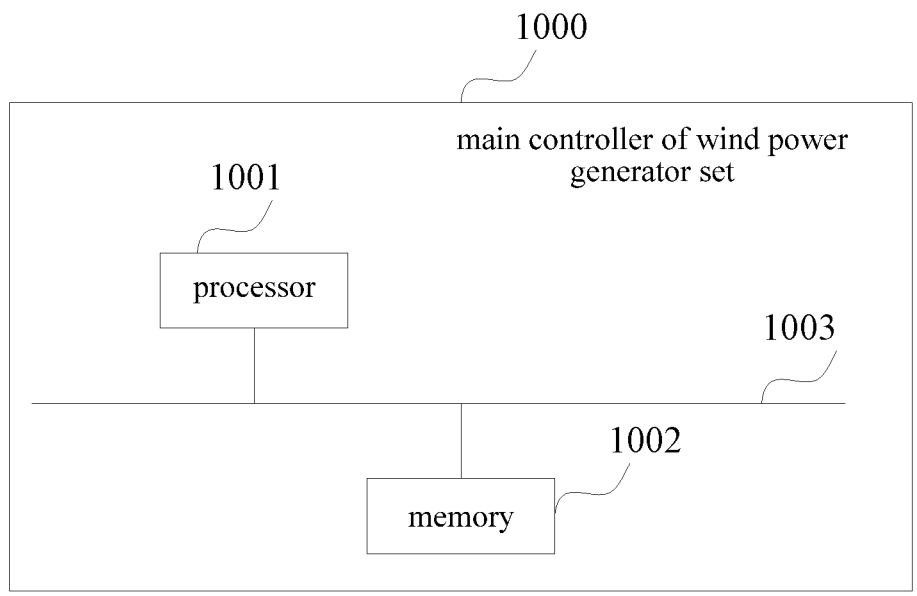
FIG. 10 is a schematic structural diagram of a main controller of a wind power generator set according to a sixth embodiment of the present disclosure.

A main controller of a wind power generator set is provided according to a sixth embodiment of the present disclosure. FIG. 10 is a schematic structural diagram of a main controller of a wind power generator set provided according to the sixth embodiment of the present disclosure. As shown in FIG. 10, a main controller 1000 of the wind power generator set may include a processor 1001 and a memory 1002. The processor 1001 may be connected to the memory 1002 via a bus 1003.

Program instructions may be stored in the memory 1002.

The processor 1001 may be configured to perform the following method when invoking the program instructions stored in the memory 1002: determining whether a real-time wind speed of the wind power generator set reaches a preset starting wind speed, when a wind speed of at least one wind power generator set in a wind farm or an anemometer tower reaches or exceeds the preset starting wind speed; and updating the quantity of analog starts when determining that the real-time wind speed reaches or exceeds the preset starting wind speed, and starting the wind power generator set when the real-time wind speed reaches or exceeds the preset starting wind speed and the quantity of the analog starts reaches a preset count value.

Optionally, the main controller 1000 of the wind power generator set may further include:

a receiver configured to receive wind coming indication information sent by a central controller. The receiver is connected to the processor 1001 via the bus 1003.

The processor 1001 is further configured to determine that the wind speed of the at least one wind power generator set in the wind farm reaches or exceeds the preset starting wind speed when the receiver receives the wind coming indication information sent by the central controller.

Optionally, the processor 1001 is further configured to set the quantity of the analog starts to zero, before determining whether the real-time wind speed reaches the preset starting wind speed; set the quantity of the analog starts to zero, after the starting module starting the wind power generator set; or set the quantity of the analog starts to zero, in a case where the quantity of the analog starts does not reach the preset count value within a preset time period from determining that the wind speed of the at least one wind power generator set or the anemometer tower reaches or exceeds the preset starting wind speed.

Optionally, the receiver is further configured to receive the quantity of the wind power generator sets of which the quantity of the analog starts changes sent by the central controller.

The processor 1001 is further configured to shorten a determination period for comparing the real-time wind speed with the preset starting wind speed in a case where the quantity of the wind power generator sets exceeds a preset threshold.

Optionally, the processor 1001 is further configured to update the quantity of the analog starts when the wind speed of the wind power generator set reaches the preset starting wind speed, during a downtime of the wind power generator set and start the wind power generator set when the quantity of the analog starts of the wind power generator set reaches the preset count value, after fault reset of the wind power generator set.

The main controllers provided according to the sixth embodiment of the present disclosure may perform the control method for starting the wind power generator set performed by any main controller shown in FIGS. 2 to 7. The specific implementation process and the beneficial effect are similar to the above embodiments, which are not described in detail herein.

Figure 11:
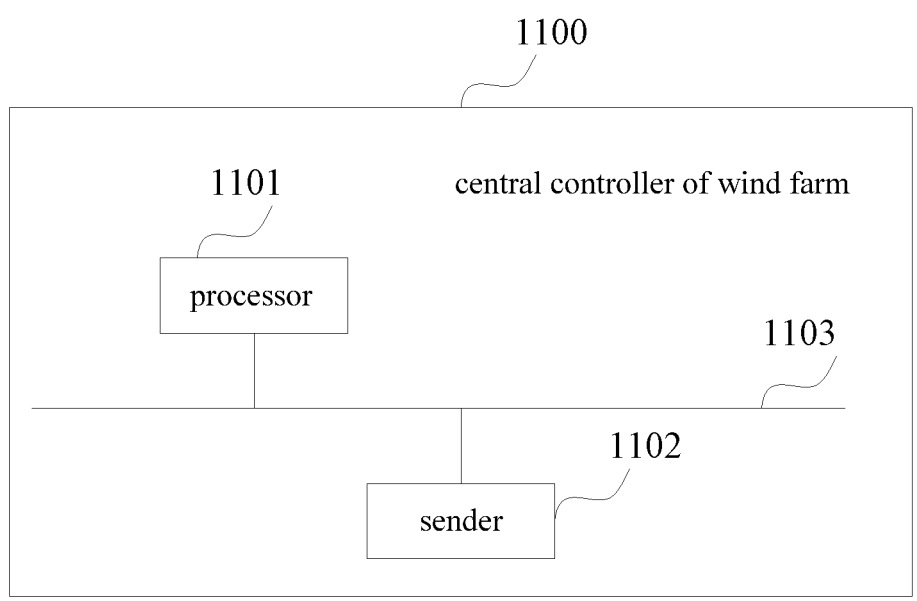
FIG. 11 is a schematic structural diagram of a central controller of a wind farm according to a seventh embodiment of the present disclosure.

A central controller of a wind farm is provided according to a seventh embodiment of the present disclosure. FIG. 11 is a schematic structural diagram of a central controller of a wind farm provided according to the seventh embodiment of the present disclosure. As shown in FIG. 11, a central controller 1100 of a wind farm may include a processor 1101 and a sender 1102. The processor 1101 is connected to the sender 1102 via a bus 1003.

The processor 1101 is configured to generate wind coming indication information when a wind speed of at least one wind power generator set in the wind farm or an anemometer tower changes and the wind speed is greater than a preset starting wind speed.

The sender 1102 is configured to send the wind coming indication information.

Optionally, the central controller 1100 of the wind farm may further include:

a receiver configured to receive the wind speed data of each of wind power generator sets in the wind farm.

The processor 1101 is configured to determine, based on the wind speed data of each of the wind power generator sets, a wind power generator set with greatest wind speed variation, among the wind power generator sets, as a reference wind turbine, and generate the wind coming indication information when a wind speed of the reference wind turbine changes and the wind speed is greater than the preset starting wind speed.

Optionally, the central controller 1100 of the wind farm may further include:

a receiver configured to receive the wind speed data reported by the anemometer tower.

The processor 1101 is further configured to generate the wind coming indication information when a wind speed of the anemometer tower changes and the wind speed is greater than the preset starting wind speed.

Optionally, the central controller 1100 of the wind farm may further include:

a receiver configured to receive a quantity of analog starts reported by each of the wind power generator sets in the wind farm.

The processor 1101 is further configured to determine a quantity of wind power generator sets of which the quantity of the analog starts changes among the wind power generator sets in the wind farm.

The sender 1102 is further configured to send the quantity of the wind power generator sets of which the quantity of the analog starts changes.

The central controller of the wind farm provided according to the seventh embodiment of the present disclosure may perform the control method for starting the wind power generator set performed by any central controller shown in FIGS. 2 to 7. The specific implementation process and the beneficial effect are similar to the above embodiments, which are not described in detail herein.

Figure 12:
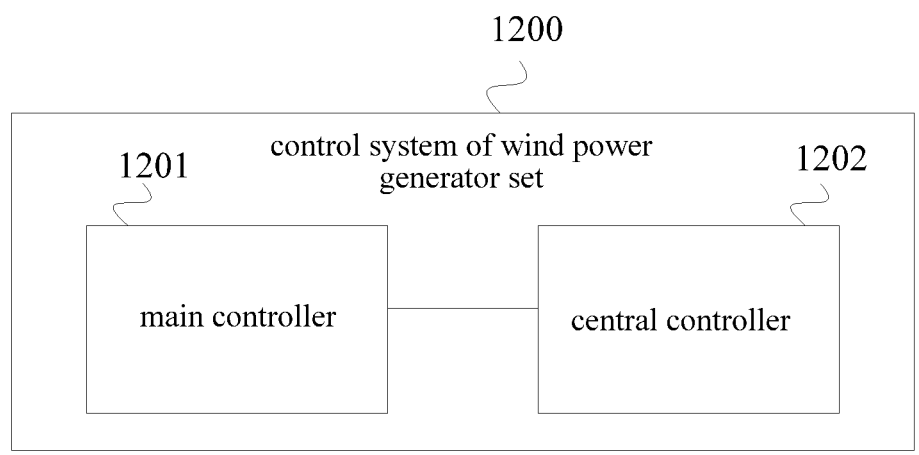
FIG. 12 is a schematic structural diagram of a control system of a wind power generator set according to an eighth embodiment of the present disclosure.

A control system of a wind power generator set is provided according to an eighth embodiment of the present disclosure. FIG. 12 is a schematic structural diagram of a control system of a wind power generator set provided according to the eighth embodiment of the present disclosure. As shown in FIG. 12, a control system 1200 of a wind power generator set may include: a main controller 1201 and a central controller 1202 connected to the main controller 1201.

The main controller 1201 may be any main controller of the wind power generator set shown in FIGS. 8 and 10 according to the above embodiments.

The central controller 1202 may be any central controller of the wind farm shown in FIGS. 9 and 11 according to the above embodiments.

The main controller included in the control system of the wind power generator set provided according to the eighth embodiment of the present disclosure may perform any control method for starting the wind power generator set performed by the main controller shown in FIGS. 2 to 7, and the central controller included in the control system of the wind power generator set may perform the control method for starting the wind power generator set performed by any central controller shown in FIGS. 2 to 7, the specific implementation process and the beneficial effect are similar to the above embodiments, which are not described in detail herein.

It should be noted that the above embodiments are only intended to describe the technical solutions of the disclosure, but not to limit the scope of the disclosure. Although the disclosure is described in detail with reference to the above embodiments, it should be understood by those ordinal skilled in the art that modifications can be made to the technical solutions in the above embodiments or equivalent replacements can be made to some or all of the technical features thereof. These modifications and equivalent replacements will not make the corresponding technical solutions deviate from the scope of the technical solutions of the embodiments of the disclosure.

The invention claimed is:

1. A control method for starting a wind power generator set, comprising:

determining, by a main controller of the wind power generator set, whether a real-time wind speed of the wind power generator set reaches a preset starting wind speed, when a wind speed of at least one wind power generator set in a wind farm or an anemometer tower reaches or exceeds the preset starting wind speed, wherein the at least one wind power generator set is located in the wind farm at a location closest to a wind coming direction, the anemometer tower is an anemometer tower located closest to the wind coming direction of the wind farm, and the wind power generator set corresponding to the main controller is any wind power generator set in the wind farm except for the at least one wind power generator set located in the wind farm at a location closest to the wind coming direction; and updating, by the main controller, the quantity of analog starts when determining that the real-time wind speed reaches or exceeds the preset starting wind speed, and starting the wind power generator set when the quantity of the analog starts reaches a preset count value, wherein the method further comprises:

determining, by the main controller, that the wind speed of the at least one wind power generator set in the wind farm or the anemometer tower reaches or exceeds the preset starting wind speed when the main controller receives wind coming indication information sent by a central controller, wherein before receiving, by the main controller, the wind coming indication information sent by the central controller, the method further comprises:

receiving, by the central controller, wind speed data reported by each of wind power generator sets in the wind farm; and determining, by the central controller based on the wind speed data of each of the wind power generator sets, a wind power generator set with greatest wind speed variation, among the wind power generator sets, as a reference wind turbine; and generating and sending, by the central controller, the wind coming indication information when a wind speed of the reference wind turbine changes and the wind speed is greater than the preset starting wind speed, wherein after receiving, by the main controller, the wind coming indication information sent by the central controller, the method further comprises:
  receiving, by the main controller, the quantity of wind power generator sets of which the quantity of the analog starts changes, sent by the central controller; and
  shortening, by the main controller, a determination period for comparing the real-time wind speed with the preset starting wind speed in a case where the quantity of the wind power generator sets of which the quantity of the analog starts changes exceeds a preset threshold.

2. The method according to claim 1, wherein the method further comprises:
  setting, by the main controller, the quantity of the analog starts to zero, before determining whether the real-time wind speed reaches the preset starting wind speed;
  setting, by the main controller, the quantity of the analog starts to zero, after starting the wind power generator set; or
  setting, by the main controller, the quantity of the analog starts to zero, in a case where the quantity of the analog starts does not reach the preset count value within a preset time period from determining that the wind speed of the at least one wind power generator set or the anemometer tower reaches or exceeds the preset starting wind speed.

3. The method according to claim 1, wherein the method further comprises:
  updating, by the main controller, the quantity of the analog starts when the wind speed of the wind power generator set reaches the preset starting wind speed, during a downtime of the wind power generator set; and
  starting, by the main controller, the wind power generator set when the quantity of the analog starts of the wind power generator set reaches the preset count value, after fault reset of the wind power generator set.

4. The method according to claim 1, wherein before receiving, by the main controller, the wind coming indication information sent by the central controller, the method further comprises:
  receiving, by the central controller, the wind speed data reported by the anemometer tower; and
  generating and sending, by the central controller, the wind coming indication information when the wind speed of the anemometer tower changes and the wind speed is greater than the preset starting wind speed.

5. The method according to claim 1, wherein before receiving, by the main controller, the quantity of the wind power generator sets of which the quantity of the analog starts changes sent by the central controller, the method further comprises:
  receiving, by the central controller, the quantity of the analog starts reported by each of the wind power generator sets in the wind farm; and
  determining, by the central controller, the quantity of the wind power generator sets of which the quantity of the analog starts changes, among the wind power generator sets in the wind farm.

6. A control system of a wind power generator set, comprising: a main controller of the wind power generator set and a central controller of a wind farm connected to the main controller, wherein
  the main controller of a wind power generator set, comprises a first processor and a memory, program instructions are stored in the memory, and the first processor is configured to execute the program instructions stored in the memory, wherein the first processor
  is configured to determine whether a real-time wind speed of the wind power generator set reaches a preset starting wind speed, when a wind speed of at least one wind power generator set in a wind farm or an anemometer tower reaches or exceeds the preset starting wind speed, wherein the at least one wind power generator set is located in the wind farm at a location closest to a wind coming direction, the anemometer tower is an anemometer tower located closest to the wind coming direction of the wind farm, and the wind power generator set corresponding to the main controller is any wind power generator set in the wind farm except for the at least one wind power generator set located in the wind farm at a location closest to the wind coming direction;
  wherein the first processor is further configured to update the quantity of analog starts when determining that the real-time wind speed reaches or exceeds the preset starting wind speed; and
  wherein the first processor is further configured to start the wind power generator set corresponding to the main controller when the real-time wind speed reaches or exceeds the preset starting wind speed and the quantity of the analog starts reaches a preset count value,
  wherein the first processor is further configured to receive wind coming indication information sent by a central controller; and
  wherein the first processor is further configured to determine that the wind speed of the at least one wind power generator set in the wind farm reaches or exceeds the preset starting wind speed when the first processor receives the wind coming indication information sent by the central controller,
  wherein the central controller of the wind farm comprises a second processor and a sender,
  the second processor is configured to generate wind coming indication information when a wind speed of at least one wind power generator set in the wind farm or an anemometer tower changes and the wind speed is greater than a preset starting wind speed; and
  the sender is configured to send the wind coming indication information to a main controller of a wind power generator set,
  wherein the second processor is further configured to receive wind speed data of each of wind power generator sets in the wind farm; and
  wherein the second processor is further configured to determine, based on the wind speed data of each of the wind power generator sets, a wind power generator set with greatest wind speed variation, among the wind power generator sets, as a reference wind turbine,
  wherein the second processor is further configured to generate the wind coming indication information when a wind speed of the reference wind turbine changes and the wind speed is greater than the preset starting wind speed,
  the first processor is further configured to receive the quantity of the wind power generator sets of which the quantity of the analog starts changes, sent by the central controller; and
  the first processor is further configured to shorten a determination period for comparing the real-time wind speed with the preset starting wind speed in a case where the quantity of the wind power generator sets of which the quantity of the analog starts changes exceeds a preset threshold.

7. The control system of the wind power generator set according to claim 6, wherein
the first processor is further configured to set the quantity of the analog starts to zero before the first processor determining whether the real-time wind speed reaches the preset starting wind speed; set the quantity of the analog starts to zero after the first processor starting the wind power generator set; or set the quantity of the analog starts to zero in a case where the quantity of the analog starts does not reach the preset count value within a preset time period from determining that the wind speed of the at least one wind power generator set or the anemometer tower reaches or exceeds the preset starting wind speed.

8. The control system of the wind power generator set according to claim 6, wherein
the first processor is further configured to update the quantity of the analog starts when the wind speed of the wind power generator set reaches the preset starting wind speed, during a downtime of the wind power generator set; and
the first processor is further configured to start the wind power generator set when the quantity of the analog starts of the wind power generator set reaches the preset count value, after fault reset of the wind power generator set.

9. The control system of the wind power generator set according to claim 6, wherein the second processor is further configured to receive wind speed data reported by the anemometer tower,
wherein the second processor is further configured to generate the wind coming indication information when a wind speed of the anemometer tower changes and the wind speed is greater than the preset starting wind speed.

10. The control system of the wind power generator set according to claim 6, wherein the second processor is further configured to receive the quantity of analog starts reported by each of the wind power generator sets in the wind farm; and
the second processor is further configured to determine the quantity of wind power generator sets of which the quantity of the analog starts changes among the wind power generator sets in the wind farm,
wherein the sender is further configured to send the quantity of the wind power generator sets of which the quantity of the analog starts changes.

* * * * *